United States Patent
La Rosa et al.

(10) Patent No.: US 7,249,590 B2
(45) Date of Patent: Jul. 31, 2007

(54) CONTROL SYSTEM FOR AN INTERNAL COMBUSTION ENGINE, IN PARTICULAR A DIESEL ENGINE

(75) Inventors: Mauela La Rosa, Giarre (IT); Felice Esposito-Corcione, Marigliano (IT); Giuseppe Esposito-Corcione, Marigliano (IT); Mario Lavorgna, Bacoli (IT); Bruno Sgammato, Pomigliano D'Arco (IT); Davide Platania, Sant'Agata Li Battiati (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/303,710

(22) Filed: Dec. 15, 2005

(65) Prior Publication Data

US 2006/0090735 A1    May 4, 2006

Related U.S. Application Data

(62) Division of application No. 10/272,478, filed on Oct. 15, 2002, now Pat. No. 7,051,714.

(30) Foreign Application Priority Data

Oct. 15, 2001    (EP) .................................. 01830645

(51) Int. Cl.
  *F02M 1/00*   (2006.01)
  *F02M 51/00*  (2006.01)

(52) U.S. Cl. ...................... 123/446; 123/478; 123/501

(58) Field of Classification Search .............. 123/446, 123/478, 480, 501, 502, 486; 701/101, 103, 701/104, 114, 115
See application file for complete search history.

(56) References Cited

U.S. PATENT DOCUMENTS

| 4,276,602 | A | * | 6/1981 | Obara et al. ................. 701/115 |
| 5,056,026 | A |   | 10/1991 | Mitchell et al. ........ 364/431.03 |
| 5,091,858 | A | * | 2/1992 | Paielli .......................... 701/115 |
| 5,231,962 | A |   | 8/1993 | Osuka et al. ................. 123/299 |
| 5,542,392 | A | * | 8/1996 | Povinger ..................... 123/480 |
| 5,794,586 | A | * | 8/1998 | Oda et al. .................... 123/305 |
| 6,356,186 | B1 | * | 3/2002 | Price et al. ............. 340/426.11 |
| 6,363,906 | B1 | * | 4/2002 | Thompson et al. ... 123/198 DB |
| 6,378,487 | B1 |   | 4/2002 | Zukouski et al. ........... 123/299 |
| 6,516,782 | B1 | * | 2/2003 | Thomas ....................... 123/436 |

(Continued)

FOREIGN PATENT DOCUMENTS

DE   196 39 172 A1   4/1998

(Continued)

*Primary Examiner*—John T. Kwon
(74) *Attorney, Agent, or Firm*—Lisa K. Jorgenson; Robert Iannucci; Seed IP Law Group PLLC

(57) ABSTRACT

An injection control method for controlling a "common rail" fuel injection system in a diesel engine is described. The method includes the following steps: an initializing step for acquiring engine control parameters; and a main adjustment cycle for adjusting operational variables of the engine. The injection control method also includes an interrupting step for adjusting an injection procedure proper of the injection system by variation of all the characteristic parameters of the injection procedure. Also described is an injection control system for a diesel engine based on the above method.

23 Claims, 5 Drawing Sheets

U.S. PATENT DOCUMENTS

| | | | |
|---|---|---|---|
| 6,543,423 B2 * | 4/2003 | Dobryden et al. | 123/480 |
| 6,705,277 B1 | 3/2004 | McGee | 123/299 |
| 6,779,511 B2 * | 8/2004 | Tonetti et al. | 123/480 |
| 2002/0108602 A1 | 8/2002 | Carroll, III, Jr. et al. | 123/456 |
| 2002/0157646 A1 | 10/2002 | Hiraku et al. | 123/456 |
| 2003/0116138 A1 * | 6/2003 | Rosa et al. | 123/480 |
| 2004/0000289 A1 | 1/2004 | Seo et al. | 123/447 |
| 2006/0054139 A1 * | 3/2006 | Yamamoto et al. | 123/468 |

FOREIGN PATENT DOCUMENTS

| | | |
|---|---|---|
| EP | 0 894 965 A1 | 2/1999 |
| EP | 1 035 314 A2 | 9/2000 |

* cited by examiner

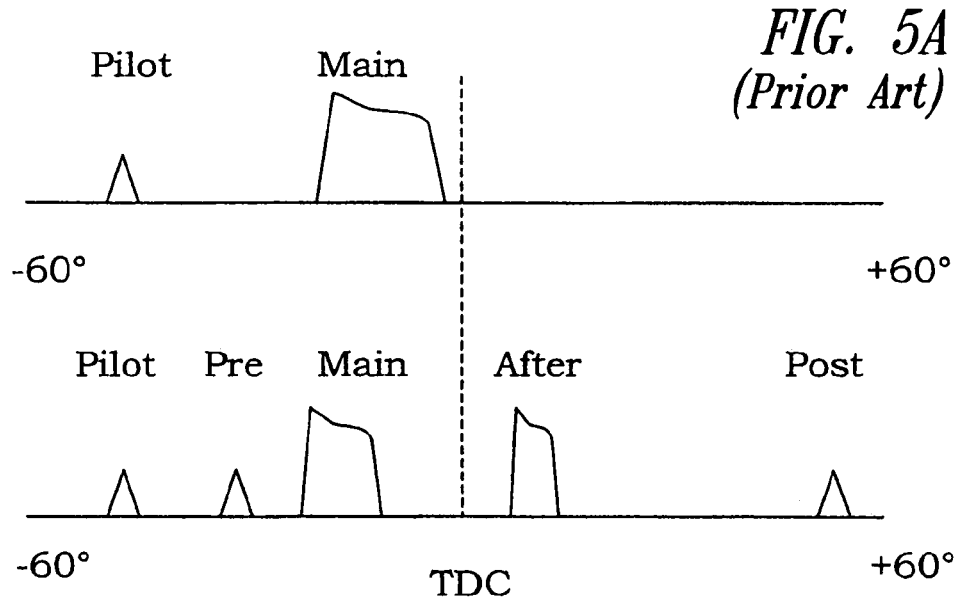
FIG. 5A
(Prior Art)
FIG. 5B
(Prior Art)
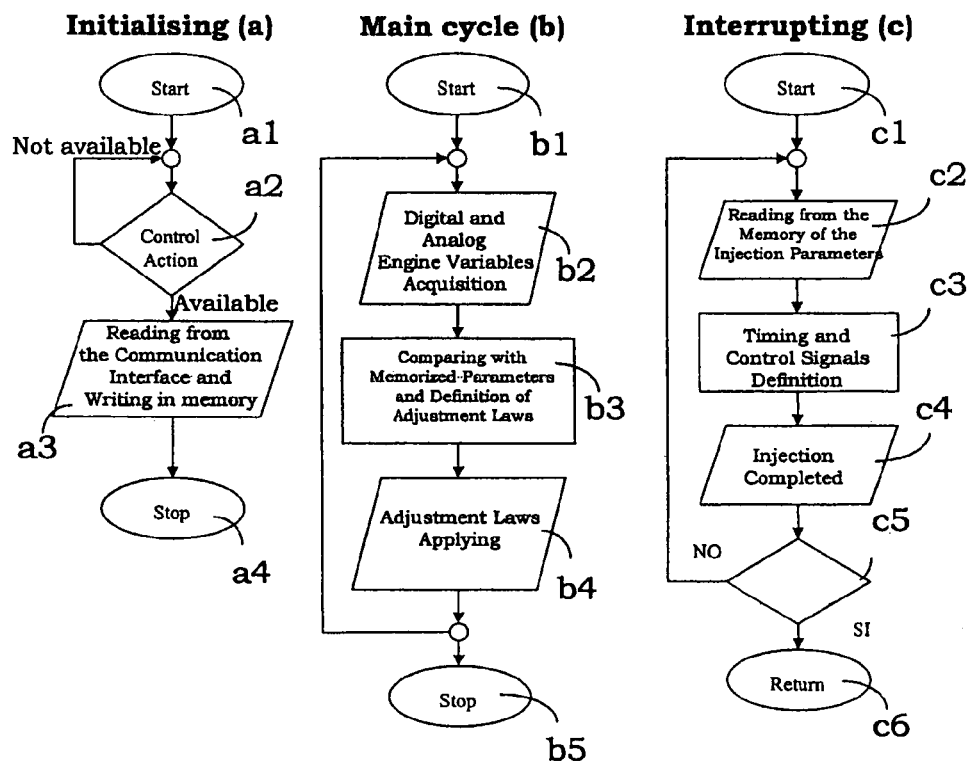
FIG. 6

CONTROL SYSTEM FOR AN INTERNAL COMBUSTION ENGINE, IN PARTICULAR A DIESEL ENGINE

BACKGROUND OF THE INVENTION

1. Field of the Invention

The present invention relates to an injection control method and system for internal combustion engines, in particular Diesel engines.

The invention specifically relates to an injection control method for controlling a CR (Common Rail) fuel injection system in a Diesel engine.

The invention relates, particularly but not exclusively, to an injection control method and system for a direct injection Diesel engine, and the following description will make reference to this application for convenience of illustration only.

2. Description of the Related Art

As it is well known, the strict restrictions on the emissions and fuel usage in internal combustion engines enacted by the European Union for application by the year 2005, along with the latest technological developments of fuel injection systems, have focused the attention of the automobile industry on the optimization of the engine fuel injection process.

At the same time, the market of Diesel-powered cars has increased from 20 to 35%, the expansion being ascribable to the superior thermodynamic efficiency of Diesel engines compared to gasoline engines, in the face of a potential for pollution that is still fairly high.

This favorable trend to the Diesel engine opens new prospects for research on fuel injection systems, fuel injection being the only input of this type of engines that can be manipulated.

Another requisite is observance of the limits enforced by standing European regulations (EURO IV and V), schematically shown in FIG. 1.

Accordingly, the Diesel engine industry is thoroughly investigating the operation of fuel injection systems, including injectors, in order to find out a flexible solution that can cope with statutory limitations.

The study of fuel injection systems must take account of that variations in the number of injections per working cycle substantially modify the percentages of polluting matter. Also the changes in percentage are of opposite signs for some substances: for example, carbon monoxide CO drastically decreases as the number of injections increases, whereas "white smoke" or hydrocarbons HC increases with the number of injections, as it is shown in FIG. 2.

FIG. 2 is a comparative graph of the percentages of combustion noise (A), specific consumption (B), emissions of nitrogen oxides $NO_x$ (C), hydrocarbons HC (E), carbon monoxide CO (F), and particulate (D) under the following conditions of operation:

one pilot injection (Pilot) and one main injection (Main);
one initial injection (Pre) and one main injection (Main);
one initial injection (Pre), one main injection (Main), and a later injection (After); and
one initial injection (Pre), a first main injection (Main1) at 50%, and a second main injection (Main2) at 50%.

It should be noted that the pilot injection and pre-injection are pulse injections, whereas the main injections last longer.

It should be further considered that fuel injection systems are presently used to serve high performance engines as made available on a large scale by recent developments in the Diesel field. These high performance engines use less fuel and exhibit much reduced carbon monoxide $CO_2$, gaseous and particulate emission values.

A comparison of the "old" indirect injection Diesel engine (IDI engine) with the "new" direct injection engine (DI engine) can help to illustrate the development.

The basic difference between an IDI engine, schematically shown at 1 in FIG. 3, and a DI engine is in the injection pressure of the injection system and in the manner of producing and burning the fuel/air mixture.

The engine 1, specifically its engine cylinder 2, includes a small swirl chamber 5 in the cylinder head 3 of the cylinder 2, which opens to the main combustion chamber placed in the head 7 of the piston 9 through a passage having suitable dimensions. The swirl chamber 5 is connected to an injector 4 and a glow plug 6. Also shown in FIG. 3 is a valve 8.

The function of the swirl chamber 5 is the one of optimizing the formation of the fuel/air mix and of the following combustion to be completed in the cylinder 2.

This combustion mode is at least 15% less efficient than that to be obtained by injecting the fuel directly into the cylinder as it is done in ID engines of recent manufacture.

IDI engines show, in fact, higher load and thermal losses through the mix transfer and combustion areas compared to ID engines.

The combustion process in a Diesel engine is typically heterogeneous, in the sense that fuel and air are not mixed together before combustion but are only contacted after the air temperature has been raised (about 500° to 600° C.) by compression in the cylinder to ignite the mix.

Until recently, the direct injection of fuel, which constitutes a significant step forward, was impracticable especially in "light-duty" engines which are conceived for higher rotational speeds than standard truck engines, because of engineering and operating problems, such as noise emission and rugged power output.

To improve on these limitations and make direct fuel injection a practical proposition, pumps and electronic control arrangements have been developed that afford higher injection pressures.

In particular a so-called "common rail" (CR) injection control system, schematically shown in FIG. 4, has been recently introduced. The CR system allows to reach enough high injection pressures such to obtain the fuel spraying in the combustion chamber, that results in a near-perfect fuel/air mix.

A CR injection system basically comprises a high-pressure radial-piston feed pump, a rail, a set of injectors connected to the high-pressure pipe, a control unit, actuators, and a plurality of sensors. The pump maintains the fuel under a high pressure and delivers it into the rail that serves all the injectors and essentially acts as a reservoir. Part of the fuel is then injected into the combustion chamber by the injectors receiving an electromagnetic command, and the rest of the fuel is returned to the fuel tank to be recycled.

The circulating fuel flow is established and monitored by sensors connected to an electronic control unit, where the pressure recorded by the sensors is compared with predetermined values and thus overpressure is driven by returning the exceeding fuel to the tank. The information from the sensors enables the control unit to adjust the amount of fuel to be injected according to the engine load and RPM, thereby providing for highly flexible management.

The pressure so produced meets the engine requirements at all ranges, unlike traditional systems where the pump was linked to the engine operation such that the pressure depended on the engine RPM and was never at optimum levels, especially at low speeds.

Further, in fast diesel engines, as light duty diesels are, mixing time must be the shortest as possible in order to ensure the engine desired performances. The innovative aspect of the CR system is that high pressures (up to 1600 bar) can be produced independently of the engine speed, so that the right amount of fuel is delivered for optimum fuel/air mixing and combustion under all conditions.

In engines already in the field and those still in the laboratory stage, the CR system is controlled by pre-set mapping. In practice, a pressure sensor mounted in the rail senses a voltage signal between 0 and 5 Volts and sends it to the control unit, where the engine operation maps (or matrices) are implemented.

Particularly in the operation maps, a duty cycle of the pressure regulator placed in the high-pressure pump corresponds to each voltage value.

Thus, when the rail pressure sensor senses the required pressure to meet a load variation and the control unit maps the appropriate duty cycle to produce that pressure (the value of the duty cycle being a function of the engine RPM), the system settles, ensuring that the injection occurs correctly.

A limitation to conventional injection control systems comes inherently from their operating method, wherein the duty cycle of the pressure regulator is set according to fixed maps. It is evident that such maps cannot account for transients and mechanical variations due to an ageing engine.

Also, the electronic control unit will decide on the duration of the injection (and, therefore, the fuel flow rate) according to the load demand once the optimum pressure is established, and with it the torques and power outputs of the engine for that speed.

It is recalled that currently available CR systems only effect two injections (the Pilot and Main injections) per cycle. However, more recent studies have led to new generation systems effecting five injections per cycle (called the Pilot, Pre, Main, After and Post injections). FIGS. 5A and 5B schematically show the injections for traditional (FIG. 5A) and new generation (FIG. 5B) systems.

BRIEF SUMMARY OF THE INVENTION

An embodiment of this invention provides a fuel injection control system which is based on a more "flexible" injection control method than those currently in use.

The method comprises the following steps:

a. an initializing step for acquiring control parameters of said engine;

b. a main adjustment cycle for adjusting operational variables which are typical of said engine; and c. an interrupting step for adjusting an injection procedure of said injection system by varying all the characteristic parameters of said injection procedure.

The injection control method is of the programmable type, which can be used either at the testing stage, or can be integrated to existing engine control systems.

In particular, all the characteristic injection parameters can be varied by the injection control method of this invention.

The features and advantages of the injection control method and system according to the invention will be apparent from the following detailed description of embodiments thereof, given by way of non-limitative examples with reference to the accompanying drawings.

BRIEF DESCRIPTION OF THE SEVERAL VIEWS OF THE DRAWINGS

In the drawings:

FIGS. 5A and 5B schematically show the injections effected in traditional CR systems and new generation CR systems according to the prior art;

FIG. 6 shows flow charts for the injection control method of an embodiment of this invention;

DETAILED DESCRIPTION OF THE INVENTION

Figure 1:
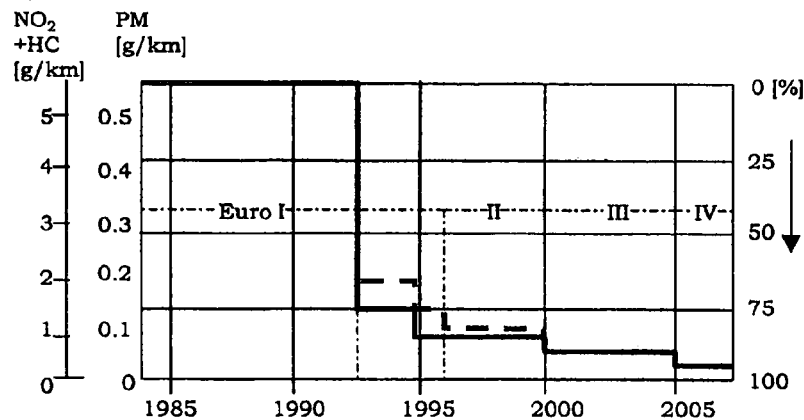
FIG. 1 schematically shows the restrictions on internal combustion engine emissions enforced by European regulations.
Figure 2:
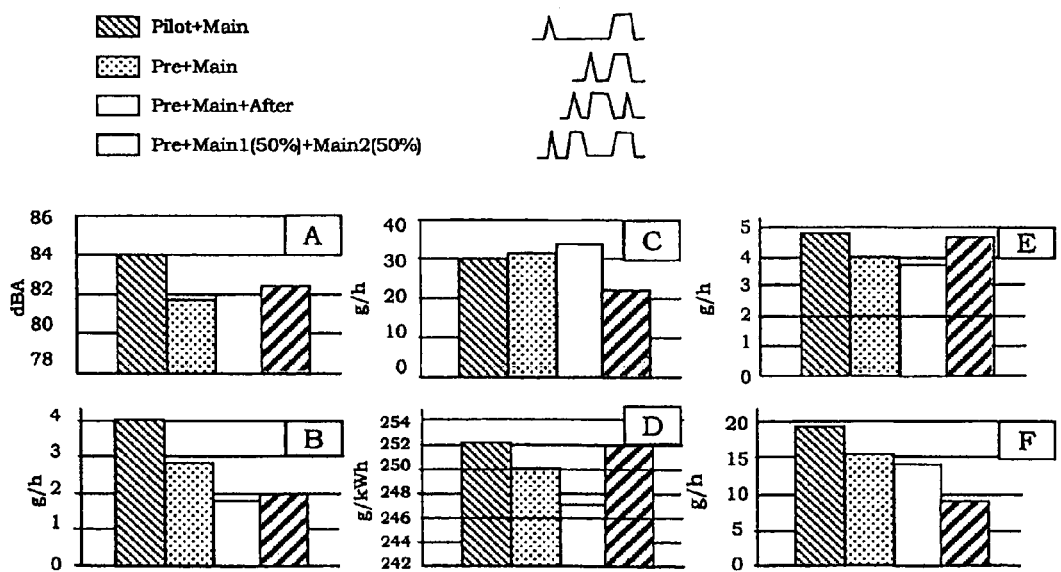
FIG. 2 schematically shows the percent variations in noise emission, specific fuel consumption, and gas and particulate emissions occurring in a direct injection Diesel engine as the number of injections changes.
Figure 3:
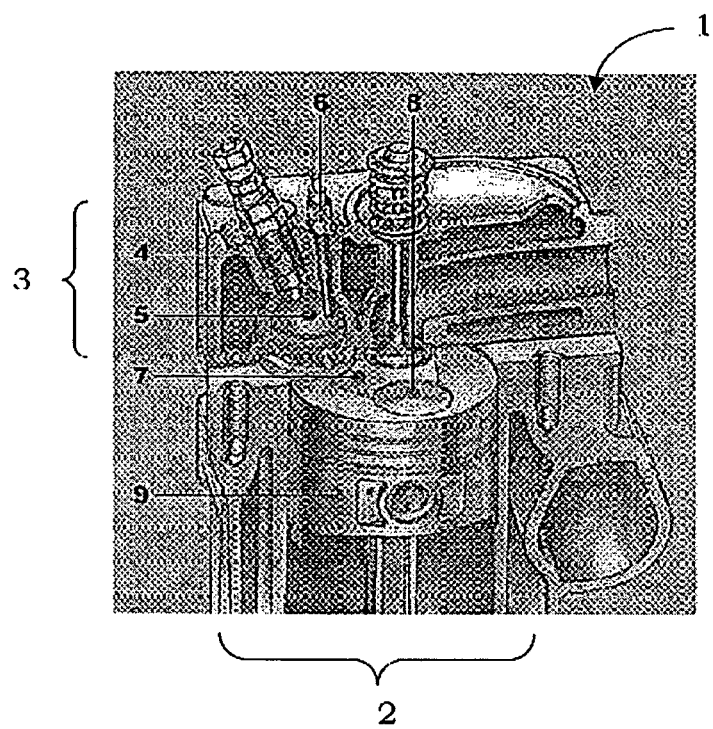
FIG. 3 schematically shows a detail view of a direct fuel injection (IDI) engine according to the prior art.
Figure 4:
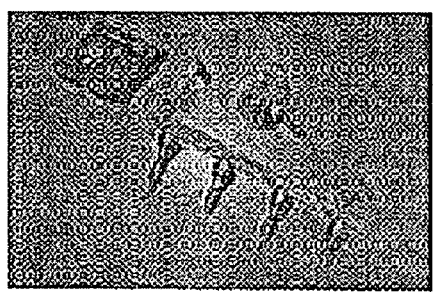
FIG. 4 schematically shows a common rail (CR) type of fuel injection system according to the prior art.

An injection control method specifically intended for a direct injection Diesel engine will be described with reference to the drawings, in particular to FIG. 6 thereof.

The injection control method of one embodiment of this invention comprises the following main steps:

a. an initializing step to acquire operating parameters of the engine;

b. a main engine variable adjusting cycle;

c. an interrupting step to adjust the fuel injection proper.

The process flow of the fuel injection control method according to the invention will now be described with reference to the main steps outlined above.

(a) Initializing Step

This step follows resetting of the injection control system that implements the method of this invention. The sequence of steps that comprises the initializing step awaits control parameters from a communication interface, and stands by until they become available (for example, until the start bit of the serial communication comes up according to the RS232 standard.).

As the control parameters become available, the injection control method acquires all the parameters from the communication interface and stores them at appropriate memory locations to make them available to the main control cycle that follows.

In particular, the initializing step comprises the following steps:

a1. starting the procedure (Start);

a2. checking the control parameters for availability (Control Action) in a feedback loop that will repeat this checking step until the control parameters are available;

a3. upon the control parameters becoming available, reading the control parameters from the Communication Interface and storing them at appropriate memory locations of the system; and a4. interrupting the procedure (Stop).

The control parameters acquired are information covering all the references of the engine variables for real time control, as well as the fuel injection profile parameters, to be implemented in the various conditions of speed (such as RPM, throttle control angle, etc.).

(b) Main Cycle

This is the gist of the injection control method. The main cycle is interrupted only by a reset signal of the injection control system, as manually produced in an emergency situation or due to malfunction (watchdog reset).

During this step, the method cyclically acquires all the engine analog and digital parameters, and compares them with the references received during the initializing step.

The results of this comparison are control actions for adjusting individual variables, no parameters being presumed to be fixed.

The main cycle comprises the following steps:

b1. starting the procedure (Start);

b2. acquiring the engine variables (corresponding to either digital or analog values);

b3. comparing the values of the engine variables acquired with the parameter values stored during the initializing step, and defining corresponding adjustment laws for application to the engine;

b4. applying the engine adjustment laws defined during the previous step (b3), and returning to the engine variable acquiring step (b2); and b5. interrupting the procedure (Stop).

Particularly and advantageously, the main cycle will adjust the engine variables that have been set at initialization, but will not act on the fuel injection itself. Fuel injection is managed by the interrupt step (c) that is synchronized with a triggering signal (Start of Injection) that is active once the engine cycle is synchronized with the reference set in terms of lead and/or lag before/after TDC (Top Dead Centre) during the engine compression phase.

(c) Interrupt Step (Injection Start)

During the engine compression phase, as the shaft reaches a starting angle set by the user, the system electronics generates an interrupt signal. The response routine to the interrupt signal will, based on the injection map entered during the initializing step, control the injector drivers by setting the number of injections, the durations of peak and hold currents, and the intervals between injections.

On completion of the last injection, the interrupt step is ended and Main Cycle resumed.

In particular, the interrupt step comprises the following steps:

c1. starting the procedure (Start);

c2. reading the fuel injection control parameters from the memory;

c3. timing the injections and the corresponding control signals;

c4. driving the power drivers that are able to effect the pre-set injections, by means of the above control signals (c3); and c5. checking the injection for completion; if the injection is not complete, returning to the read step (c2), otherwise c6. interrupting the procedure and returning to Main Cycle (Return).

The injection control method is based on a strategy of DI engine control that is aimed at meeting the ever stricter European regulations on engine emissions while retaining the performance level of current systems and providing for substantially improved drivability.

Advantageously, all injection types can be employed as the injection pressure varies and the injection strategies are scanned in a condition that is unrelated to RPM and the maps customarily provided in conventional engine control systems.

In particular, the injection control method allows all the characteristic parameters of fuel injection to be varied, namely:

Pressure
Number of injections
Intervals between injections
Duration of each injection
Timing to the TDC
Injection profile
Amplitude and duration of the peak currents at each injection
Amplitude and duration of the hold currents at each injection
Rate of injections per cycle Summarizing, the injection control method t promotes a flexible injection policy by allowing a thorough study of how fuel injection profile, engine emissions, and engine performance, interact.

Figure 7:
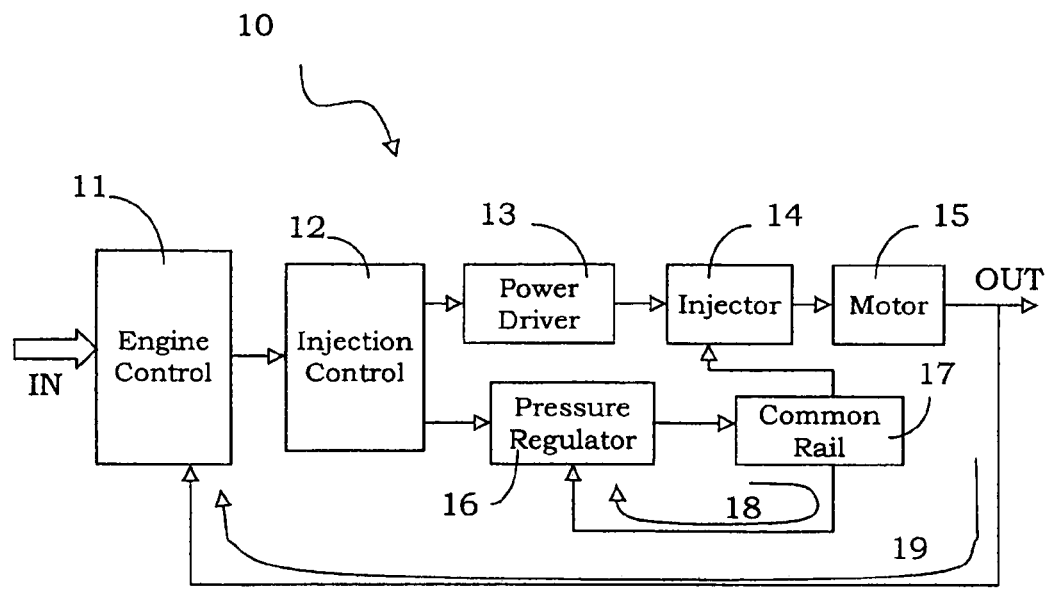
FIG. 7 shows a general engine control layout.

An injection control system based on the above injection control method has been realized for incorporation in the general control layout 10 of a Diesel engine equipped with a common rail (CR) injection system currently available on the market, as it is shown in FIG. 7.

The general control layout 10 includes an input terminal IN, which is connected to an engine control block 11 having its output connected to an injection control block 12. The injection control block 12 has its output connected to a cascade of a power driver 13, an injector block 14, and the engine 15.

The output of the injection control block 12 is further connected to a cascade of a pressure regulator 16 and a Common Rail or CR system 17.

The CR system 17 is connected to the injector block 14 and the pressure regulator 16 to form a first feedback path 18, and the engine 15 is connected to the engine control block 11 to form a second feedback path 19.

In particular, the pressure regulator 16 changes its operational parameters according to pressure information incoming over the first feedback path 18 from the CR system 17, the CR system controlling the injector block 14 in its turn.

Information about the engine, such as RPM and attainment of TDC, is supplied to the engine control block 11 over the second feedback path 19.

As mentioned before, the injection control method any injection forms as injection pressure varies, and allows variation of all the characteristic parameters of injection.

In one embodiment, the invention provides an injection control system having an "open" type of structure, such that certain parameters hitherto regarded as "fixed" in traditional control systems of literature, e.g,. the number of injections effected per engine cycle, can now be varied.

This injection control system is, moreover, unaffected by the technical features of the actuators (in the instance of a Diesel engine, they are injectors and a high pressure injection pump) and is appropriate to study and characterize any engines under different conditions and different speeds, so as to optimize their use in any operating ranges from warm-up to top speed.

Figure 8:
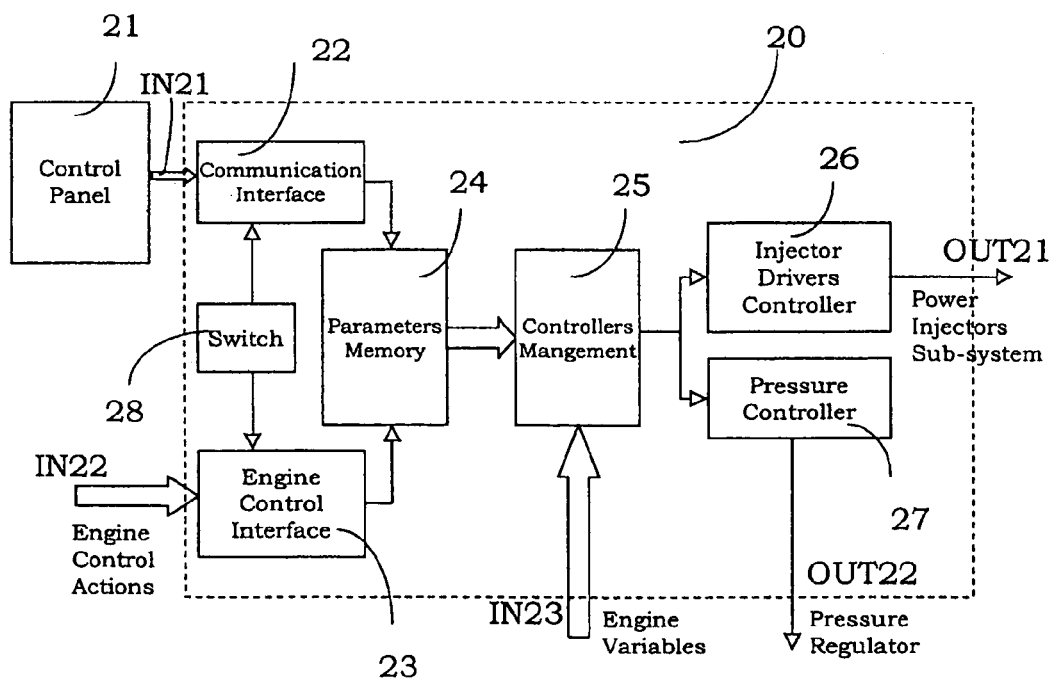
FIG. 8 schematically shows a fuel injection control block according to the invention, for incorporation in the diagram of FIG. 7.

Advantageously, an injection control system 20, schematically shown in FIG. 8, is used instead of the injection control block 12 provided in the general layout 10.

The injection control system 20 is, therefore, fully compatible with the engine control arrangements currently available on the market.

In particular, the injection control system 20 has its input connected to a control panel 21 adapted to receive user's specifications such as the injection profile, pressure references, engine variables, and monitoring signals. The control panel 21 outputs a user's specification coding to a first input terminal IN21 of the injection control system 20.

It should be emphasized that the control panel 21 is essentially a block for laboratory experimentation. In particular, the control panel 21 allows an injection strategy to be set and the corresponding engine response monitored by an operator.

Figure 9:
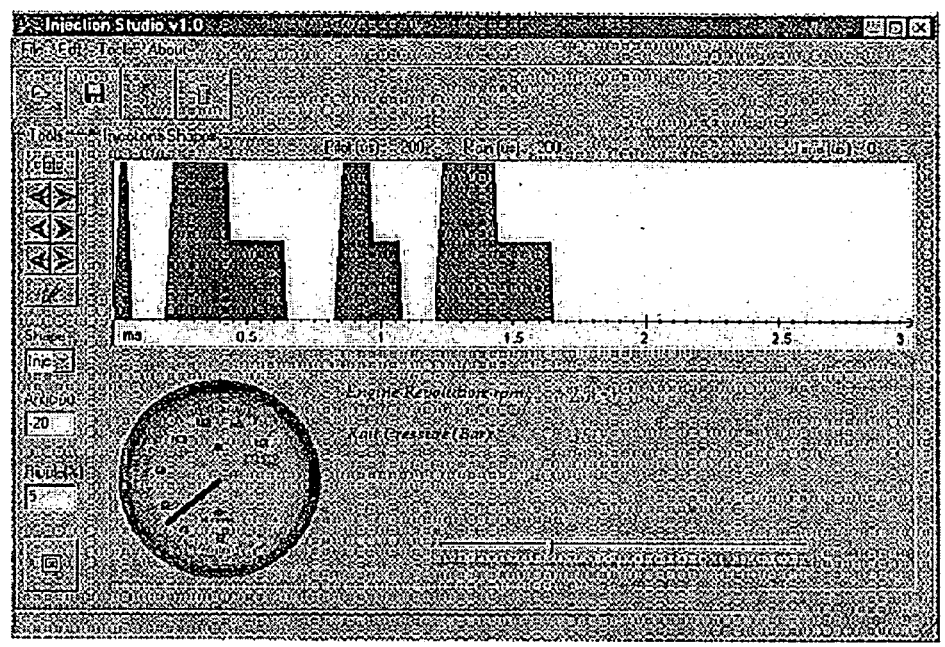
FIG. 9 shows an exemplary interface with the fuel injection control block of FIG. 8.

For experiments of this kind, the control panel 21 is typically provided in the form of a processor and display facilities, as schematically shown in FIG. 9. Known is to use a dedicated software with a display.

In particular, the injection control system 20 comprises a communication interface 22 connected to the first input terminal IN21 to receive the user's specification coding. The communication interface 22 re-processes the codes and outputs address signals, data, and controls concerning the user's specifications to a memory 24.

The communication interface 22 essentially provides a means of transferring into the memory 24 injection profiles that are externally set through the control panel 21.

The injection control system 20 further comprises an engine control interface 23 arranged to receive, on a second input terminal IN22 of the injection control system 20, signals related to the engine control actions from an external unit.

The engine control interface 23 also supplies address signals, data, and controls about the engine control actions, to the memory 24.

Memory 24 is the system memory, and contains all the parameters that are required for implementing specified injection profiles and controlling the pressure in the CR system.

It should be emphasized that the engine control interface 23 enables full integration of the injection control system 20 with engine control systems that are available at present and are in the laboratory stage, so as to provide the necessary flexibility for full utilization of the CR system potential.

In other words, the engine control interface 23 allows the injection control system 20 as a whole to be used as actuator of a complete existing engine control system.

Furthermore, the engine control interface 23 and the communication interface 22 are connected to a switch 28 that controls their exclusive operation such that the injection control system 20 can be operated either as a testing device (the supervised mode) or as a car-fitted device. Particularly in the test mode, the switch 28 turns on the communication interface 22 and turns off the engine control interface 23, while in the car-fitted mode, the switch 28 dually turns off the communication interface 22 and turns on the engine control interface 23.

The memory 24 has its output connected to a controller management block 25 to supply it with injection characterizing data and engine variables. The controller management block 25 receives, on a third input terminal IN23 of the injection control system 20, analog/digital signals from the engine variable-measuring systems, and outputs suitable control signals to a first controller 26 of the injector drivers and pressure control signals to a second controller 27 of the pressure regulator in the CR system.

In other words, the controller management block 25 operates to acquire, from the memory 24, the aforementioned characterizing parameters, and effects a conversion between these specifications and the control actions to be applied, thereby generating suitable signals that are addressed to the controllers 26 and 27 connected to its output.

In particular, the first controller 26 is input the timing specifications of the digital signals actuating the power devices (injectors) and supplies, to a first output terminal OUT21 of the injection control system 20, suitable digital signals actuating an injector power subsystem.

A typical output signal from the first controller 26 is a PWM signal that is generated in connection with the duty cycle and the rate set by the controller management block 25.

Likewise the second controller 27 is input the timing specifications of the digital signals actuating the regulating devices (in particular, valves) and supplies, to a second output terminal OUT22 of the injection control system 20, suitable digital signals actuating the pressure regulator 16 of the CR system.

In other words, the second controller 27 suitably sets the pressure values that have been indicated in defining the injection profile. These values depend on the type of pressure regulator employed in the CR system.

In a preferred embodiment of the injection control system 20, the controller management block 25 generates input signals to the first controller 26 of the injector drivers in terms of setting the duty cycle and frequency of a suitable PWM signal, as dictated by the pattern (shape) set for the injection.

The sequence of operations that are contingent on the controller management block 25 are performed while ensuring their synchronization with the engine variables as suitably processed.

Figure 10:
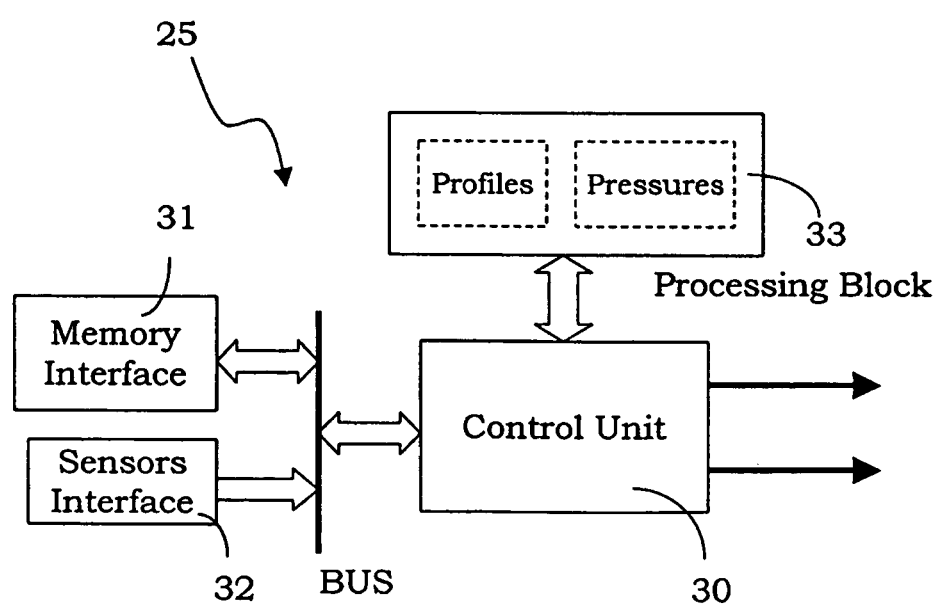
FIG. 10 schematically shows a controller management block for incorporation in the fuel injection control block of FIG. 8.

One embodiment of the controller management block 25 is schematically shown in FIG. 10.

The controller management block 25 comprises a central control unit 30 that is connected, through a bus, to a memory interface 31, a sensor interface 32, and a processing block 33.

The processing block 33 essentially comprises data concerning the injection profiles to be implemented and the pressure values to be maintained in the CR system.

Advantageously according to the invention, the injection control system can be used not only in the supervised mode for thoroughly testing a fuel injection system, but also as an integral part of an engine control system of the kind to be found in a car, since it is perfectly compatible with the systems currently available on the market.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. An injection control system for a diesel engine equipped with a fuel injection system of the common rail type, comprising:
   an input terminal connected to an engine control block;
   first and second output terminals connected to injector power drivers and a pressure regulator of said injection system, respectively;
   a memory storing characterizing parameters of said engine operation;
   first and second controllers for controlling the injector power drivers and the pressure regulator, respectively; and
   a controller management block connected to said input terminal through the memory and connected to said output terminals through the first and second controllers, said controller management block receiving, from a further input terminal of said injection control system, measurement signals concerning engine variables, and outputting, through said first and second controllers, suitable control signals to said injector power drivers and said pressure regulator, wherein said characterizing parameters are real time varied based on a comparison between the characterizing parameters and the measurement signals, and wherein the suitable control signals are based on the real time varied characterizing parameters resulting from the comparison.

2. The injection control system according to claim 1, wherein said control signals to said injector power drivers are PWM signals having duty-cycle and frequency values that are set according to an injection profile.

3. The injection control system according to claim 1, wherein said control signals to said pressure regulator set pressure values based on an injection profile, and are dependent on the type of pressure regulator being used.

4. The injection control system according to claim 1, wherein said controller management block is operated to ensure synchronization with suitably processed engine variables.

5. The injection control system according to claim 1, further comprising:
   an additional input terminal; and
   a communication interface connected between the additional input terminal and said memory, said communication interface being structured to receive on an input suitable user's signals and to output corresponding user's parameters, said user's parameters being characterizing parameters of said engine operation that are stored in said memory.

6. The injection control system according to claim 5, wherein said communication interface is connected with said additional input terminal to a control panel to receive suitable user's specifications and to output said user's parameters, said control panel being an experimentation block used for defining an injection strategy and allowing the corresponding operation of said engine to be monitored by an operator.

7. The injection control system according to claim 5, wherein said user's specifications include an injection profile, pressure references, engine variables, and user-set monitoring signals.

8. The injection control system according to claim 1, further comprising an engine control interface connected to said input terminal and said memory, said control interface being structured to receive suitable engine control signals and to output corresponding engine control parameters, said engine control parameters being characterizing parameters of said engine operation that are stored in said memory.

9. The injection control system according to claim 8, further comprising:
   an additional input terminal;
   a communication interface connected between the additional input terminal and said memory, said communication interface being structured to receive on an input suitable user's signals and to output corresponding user's parameters, said user's parameters being characterizing parameters of said engine operation that are stored in said memory; and
   a switch connected to said control interface and said communication interface and operative to enable operation of the control and communication interfaces in a mutually exclusive manner, said switch turning on said communication interface and turning off said control interface in a testing mode, and dually turning off said communication interface and turning on said control interface in the instance of the device being mounted on a car.

10. A diesel engine system, comprising:
    a diesel engine equipped with a common rail fuel injection system having a common rail and a plurality of fuel injectors;
    a pressure regulator coupled to the common rail and structured to regulate fuel pressure in the common rail;
    a power driver coupled to the fuel injectors and structured to drive the fuel injectors; and
    an injection controller that includes:
    a first input terminal connected to receive measurement signals concerning engine variables;
    an injector driver controller having an output structured to control the power driver;
    a pressure controller having an output structured to control the pressure regulator;
    a parameter memory structured to store characteristic parameters of the diesel engine; and
    a controller manager connected to the first input terminal, memory, injector driver controller, and pressure controller, and being structured to compare the characteristic parameters from the memory with the measurement signals, and in response, control the pressure controller and injector driver controller, wherein the characteristic parameters are real time varied based on the comparison between the characteristic parameters and the measurement signals.

11. The diesel engine system of claim 10, wherein the controller manager includes:
    a sensor interface coupled through the first input terminal to engine sensors to receive the measurement signals from the engine sensors;
    a memory interface coupled to the memory to obtain the characteristic parameters from the memory; and
    a central control unit that compares the measurement signals with the characteristic parameters.

12. The diesel engine system of claim 10 wherein the injection controller includes a second input terminal and an engine control interface connected to the second input terminal and the memory, the engine control interface being structured to receive suitable engine control signals via the second input terminal and to output corresponding engine control parameters that are the characterizing parameters stored in the memory.

13. The diesel engine system of claim 10 wherein the injection controller includes:
- an engine control interface connected to the memory and structured to receive suitable engine control signals from the engine;
- a communication interface connected to the memory and structured to receive suitable user signals and to output corresponding user parameters that are the characterizing parameters of the engine; and
- a switch operative to enable operation of the engine control and communication interfaces in a mutually exclusive manner, the switch turning on said communication interface and turning off said control interface in a testing mode, and dually turning off said communication interface and turning on said control interface in an engine operation mode.

14. An injection control system for a diesel engine equipped with a common rail fuel injection system that includes injector power drivers and a pressure regulator, comprising:
- a memory storing characterizing parameters of operation of the engine;
- receiving means for receiving measurement signals that provide measured engine variables during operation of the engine;
- comparing means for comparing the measured engine variables with the stored characterizing parameters;
- updating means for updating the stored characterizing parameters based on the comparing; and
- outputting means for outputting suitable control signals to the injector power drivers and the pressure regulator based on the updated characterizing parameters.

15. The system of claim 14, wherein the control signals to the injector power drivers are PWM signals having duty-cycle and frequency values that are set according to an injection profile of the characterizing parameters.

16. The system of claim 14, wherein the control signals to the pressure regulator set pressure values based on an injection profile, and are dependent on the type of pressure regulator being used.

17. The system of claim 14, further comprising:
- means for receiving input signals from a user; and
- means for adjusting the stored characterizing parameters based on the input signals received from the user.

18. The system of claim 17, wherein the input signals received from the user include an injection profile, pressure references, engine variables, and user-set monitoring signals.

19. The system of claim 14, wherein the characteristic parameters include a pressure value, a number of injections to be effected in one operating cycle of the engine, values of intervals between injections, a duration of each injection, timing with respect to a Top Dead Center, an injection profile, amplitude and duration values of peak currents for each injection, amplitude and duration values of hold currents for each injection, and an injection rate per cycle, with no parameters being presumed to be fixed.

20. The system of claim 14, further comprising:
- starting an initializing procedure for acquiring control parameters of the vehicle;
- checking the control parameters for availability in a feedback loop that repeats the checking step until the control parameters are available; and
- upon the control parameters becoming available, reading the control parameters from a communication interface prior to storing them in the memory.

21. The injection control system of claim 1 wherein the characterizing parameters include fuel pressure and injector energizing times which are independently varied based on the comparison between the characterizing parameters and the measurement signals.

22. The diesel engine system of claim 10 wherein the characteristic parameters include fuel pressure and injector energizing times which are independently varied based on the comparison between the characteristic parameters and the measurement signals.

23. The system of claim 14 wherein the characterizing parameters include fuel pressure and injector energizing times which are independently varied based on the comparison between the measured engine variables and the stored characterizing parameters.

* * * * *

UNITED STATES PATENT AND TRADEMARK OFFICE
CERTIFICATE OF CORRECTION

PATENT NO. : 7,249,590 B2 Page 1 of 1
APPLICATION NO. : 11/303710
DATED : July 31, 2007
INVENTOR(S) : Manuela La Rosa et al.

It is certified that error appears in the above-identified patent and that said Letters Patent is hereby corrected as shown below:

Title Page item 75
Inventors, "Mauela La Rosa" should read -- Manuela La Rosa --

Signed and Sealed this

First Day of April, 2008

JON W. DUDAS
*Director of the United States Patent and Trademark Office*